(12) United States Patent
Tanaka

(10) Patent No.: US 7,689,322 B2
(45) Date of Patent: Mar. 30, 2010

(54) ROBOT APPARATUS AND METHOD OF CONTROLLING THE MOTION THEREOF

(75) Inventor: Fumihide Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 1175 days.

(21) Appl. No.: 11/146,019

(22) Filed: Jun. 7, 2005

(65) Prior Publication Data

US 2006/0020368 A1 Jan. 26, 2006

(30) Foreign Application Priority Data

Jun. 7, 2004 (JP) .......................... P2004-168785

(51) Int. Cl.
*G06F 19/00* (2006.01)
(52) U.S. Cl. ...................... 700/259; 700/245
(58) Field of Classification Search .............. 700/245, 700/259
See application file for complete search history.

(56) References Cited

U.S. PATENT DOCUMENTS

| 6,650,965 B2 * | 11/2003 | Takagi et al. ................. 700/245 |
| 2004/0039483 A1 * | 2/2004 | Kemp et al. .................. 700/245 |

FOREIGN PATENT DOCUMENTS

| JP | 2001-212783 | 8/2001 |
| JP | 2001-246174 | 9/2001 |
| JP | 2001-246580 | 9/2001 |
| JP | 2002-086378 | 3/2002 |
| JP | 2002-219677 | 8/2002 |
| JP | 2002-239962 | 8/2002 |
| JP | 2003-334778 | 11/2003 |
| JP | 2004-066351 | 3/2004 |
| WO | WO 02/099545 A1 | 12/2002 |

OTHER PUBLICATIONS

JP 2001-246174 Translation.*
"Online, Interactive Learning of Gestures for Human/Robot Interfaces" Lee and Xu.*

(Continued)

*Primary Examiner*—Thomas G Black
*Assistant Examiner*—Ce Li
(74) *Attorney, Agent, or Firm*—Finnegan, Henderson, Farabow, Garrett & Dunner, L.L.P.

(57) ABSTRACT

The present invention provides a robot apparatus is capable of moving autonomously, flexibly responding to a motion of conforming to an external moving subject that may typically be the user of the robot apparatus and conforming to the motion of the moving subject, and also capable of modifying the conforming relationship with the moving subject. The robot apparatus is capable of moving autonomously, and comprises an input section that inputs an image or sound of an external moving subject, a plurality of motion generating sections that generate a plurality different motions in response to the image or sound input by way of the input section, conforming to the motion of the external moving subject, a motion expressing section that integrally expresses one or more than one motions out of the plurality of motions generated by the plurality of motion generating sections, and a control section that controls the number of motions integrated by the motion expressing section and the ratio of the motions to be integrated.

11 Claims, 5 Drawing Sheets

OTHER PUBLICATIONS

"Sumbolization and Imitation Learning of Motion Sequence Using Competitive Modules", Samejima.*

Kazuyuki Samejima et al., "Symbolization and Learning-by-watching of a Locomotive Pattern by the Module Contention," Institute of Electronics, Information and Communication Engineers, Jan. 2002, pp. 90-100.

Lee et al., "Online, Interactive Learning of Gestures for Human Robot Interfaces", 1996 IEEE International Conference on Robotics and Automation, Apr. 22-28, 1996, Minneapolis, Minnesota, pp. 2982-2987.

Masato Ito et al., "On-line Imitative Interaction with a Humanoid Robot Using a Mirror Neuron Model", IEEE International Conference on Robotics and Automation, 2004 (6 pages).

Javier R. Movellan et al., "The Next Generation of Automatic Facial Expression Measurement" (13 pages), from P. Elkman et al., "What the Face Reveals," 2005.

* cited by examiner

ROBOT APPARATUS AND METHOD OF CONTROLLING THE MOTION THEREOF

CROSS REFERENCES TO THE RELATED APPLICATIONS

The present invention contains subject matter related to Japanese Patent Application JP 2004-168785 filed in the Japanese Patent Office on Jun. 7, 2004, the entire contents of which being incorporated herein by reference.

BACKGROUND OF THE INVENTION

1. Field of the Invention

This invention relates to a robot apparatus capable of moving autonomously and a method of controlling the motion thereof. More particularly, the present invention relates to a robot apparatus capable of moving autonomously, conforming to a motion of an external moving subject that may typically be as a user of the robot apparatus and also to a method of controlling the motion thereof.

2. Description of the Related Art

A mechanical apparatus that is electrically or magnetically driven to move and act like a man (living thing) is called a "robot". In Japan, robots became popular in the late 1960s but many of them are industrial robots such as manipulators and carrier robots designed to realize unmanned automated production lines in factories.

Recently, developments of utility robots that can operate as men's partners to support human activities in various different scenes in living environments of human being are under way. Unlike industrial robots, such utility robots are provided with the ability of learning by themselves a number of techniques necessary to adapt themselves to different people with different personalities in various scenes of living environments of human being and also to various environments. For example, "pet type" robots designed by imitating the physical mechanism and motions of tetrapodal animals such as dogs and cats and "humanoid" robots designed by imitating the physical mechanism and motions of men who are creatures of erect bipedalism are being put to practical use. Unlike industrial robots, such robot apparatus can move in various different ways because of their entertaining capabilities and hence they are also sometimes referred to as entertainment robots.

One of the most important themes in the technological development of such entertainment robots is the necessity of pursuing a scheme that can keep the user away from being bored. However, since boringness to men has not been elucidated yet, it is obviously difficult to prepare a scheme that can keep the user away from being bored. Therefore, techniques for preparing many schemes for attracting the user's interest are being devised and employed currently.

Schemes for making a robot apparatus to move, conforming to the voice and the motion of the user have been proposed (see, inter alia, Patent Document 1: Japanese Patent Application Laid-Open No. 2001-246174 and Non-Patent Document 1: Masato Ito, Jun Tani, "On-line Imitative Interaction with a Humanoid Robot Using a Mirror Neuron Model", IEEE International Conference on Robotics and Automation (2004, in press).

SUMMARY OF THE INVENTION

With the technique described in the above-cited Patent Document 1, it is possible to draw the user into a conversation with a pseudo-listener, or a robot apparatus, by containing in the robot apparatus a mechanism for a scheme for generating a drawing (conforming) phenomenon such as a nodding motion, a winking motion or a gesturing motion in response to a sounded voice of the user. However, the conforming scheme described in the Patent Document 1 does not provide a flexible learning ability and hence gives rise to a problem that it is difficult for the robot apparatus to flexibly interact with the user in various different ways. Additionally, since the conforming pattern of the scheme contained in the robot apparatus in advance is not adapted to be modified, the behavior of the robot apparatus gradually becomes boring to the user as it interacts with the latter.

With the technique described in the above-cited Non-Patent Document 1, on the other hand, a robot apparatus can learn a conforming scheme by means of a recurrent type neural network (RNN) that is provided with a parametric bias. In other words, it can build a motion model by learning joint angle time series data that are obtained by mimicking motion, conforming to a motion of the user by using the RNN after the learning. However, the robot apparatus can only built a basic conforming relationship by means of the above-cited Non-Patent Document 1 and hence it is difficult for the robot apparatus to deal with a complex conforming relationship. Additionally, since it is not possible for the robot apparatus to modify the conforming relationship established by using the RNN. The robot apparatus can become gradually boring to the user as it interacts with the latter.

In view of the above identified circumstances, it is therefore desirable to provide a robot apparatus capable of moving autonomously, flexibly responding to a motion of conforming to an external moving subject that may typically be a user of the robot and conforming to the motion of the moving subject, and also capable of modifying the conforming relationship with the moving subject and also a method of controlling the motion thereof.

According to the present invention, there is provided a robot apparatus capable of moving autonomously, the robot apparatus comprising: an input means for inputting an image or sound of an external moving subject; a plurality of motion generating means for generating a plurality different motions in response to the image or sound input by way of the input means, conforming to the motion of the external moving subject; a motion expressing means for integrally expressing one or more than one motions out of the plurality of motions generated by the plurality of motion generating means; and a control means for controlling the number of motions integrated by the motion expressing means and the ratio of the motions to be integrated.

A robot apparatus according to the invention may further comprise a plurality of modulation means for modulating the respective motions generated by the plurality of motion generating means. In this instance, the control means controls the modulation processes of the plurality of modulation means.

According to the present invention, there is also provided a method of controlling the motion of a robot apparatus capable of moving autonomously, the method comprising: an input step of inputting an image or sound of an external moving subject: a plurality of motion generating steps of generating a plurality different motions in response to the image or sound input in the input step, conforming to the motion of the external moving subject; a motion expressing step of integrally expressing one or more than one motions out of the plurality of motions generated in the plurality of motion generating steps; and a control step of controlling the number of motions integrated in the motion expressing step and the ratio of the motions to be integrated.

Thus, since a robot apparatus according to the invention comprises a plurality of motion generating means for generating a plurality of different motions, conforming to the motion of an external moving subject, who may typically be the user of the robot apparatus, so as to integrally express one or more than one motions out of the plurality of generated motions, it can deal with a complex conforming relationship when moving in response to the motion of the external moving subject, conforming to the motion of the latter. Additionally, since a robot apparatus according to the invention modulates the respective motions generated by the plurality of motion generating means and controls the number of motions integrated by the motion expressing means and the ratio of the motions to be integrated, it can realize a motion that is less boring to the external moving subject, who may typically be the user of the robot apparatus.

DETAILED DESCRIPTION OF THE PREFERRED EMBODIMENTS

Now, the present invention will be described in greater detail by referring to the accompanying drawings that illustrate a preferred embodiment of the invention. This embodiment is a biped type robot apparatus provided with affect models formed by modeling affects such as instinct and emotion. The robot apparatus is a utility robot that supports human activities in various different scenes of daily life in a domestic environment or some other environment. It is also an entertainment robot that can do basic motions that are specific to human being. In the following, the configuration of the robot apparatus will be described first and then the method of controlling the motions of the robot apparatus will be described in detail.

(1) Configuration of Robot Apparatus

Figure 1:
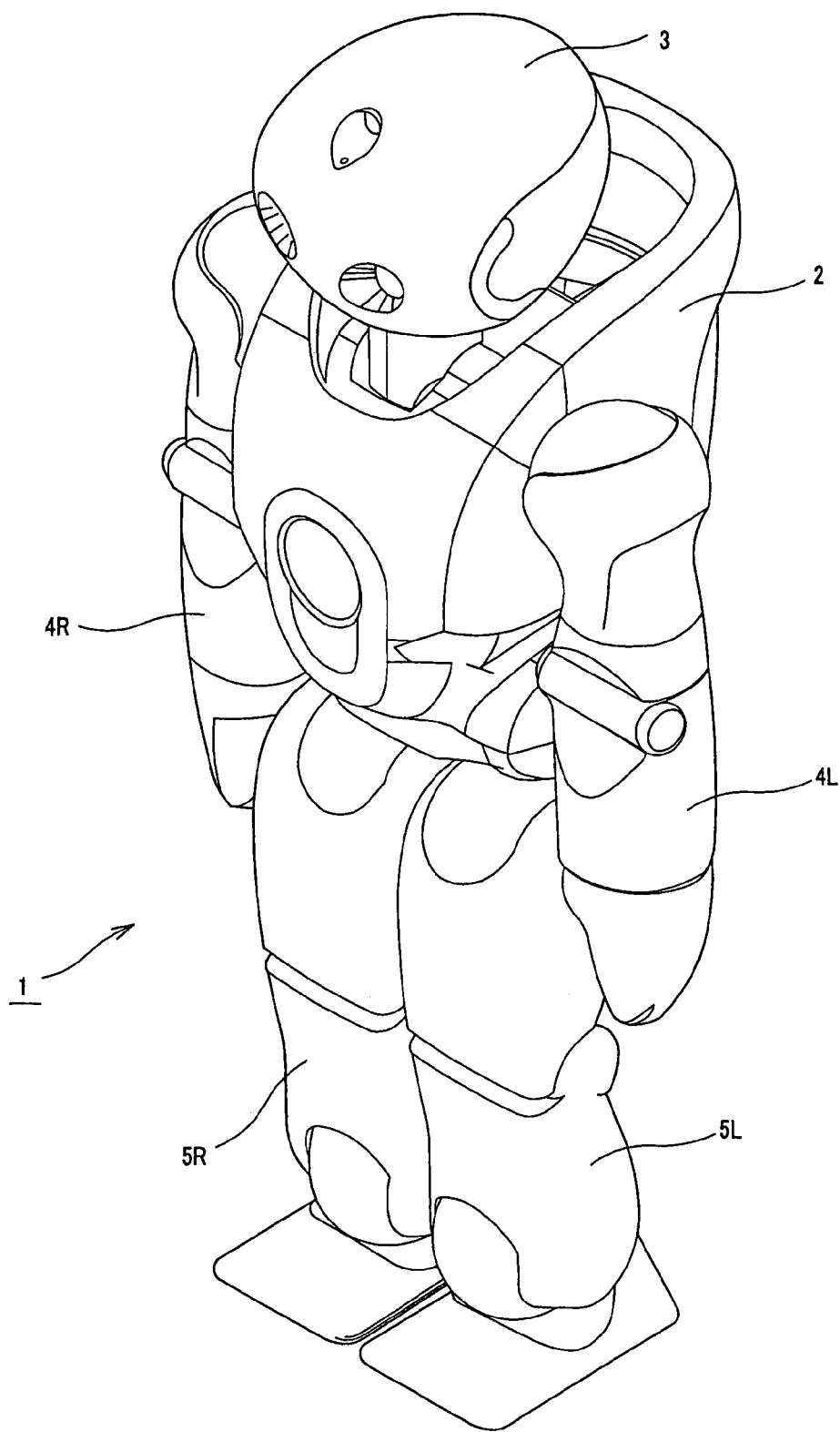
FIG. 1 is a schematic perspective view of an embodiment of robot apparatus according to the invention, illustrating its appearance.

Firstly, the configuration of the robot apparatus of this embodiment will be described. As shown in FIG. 1, the robot apparatus 1 of this embodiment comprises a trunk unit 2, a head unit 3 linked to a predetermined position of the trunk unit 2, left and right arm units 4R/L and left and right leg units 5R/L, the arm units 4R/L and the leg units 5R/L also being linked to the trunk unit 3. (R and L are prefixes respectively denoting right and left throughout this letter of specification.)

Figure 2:
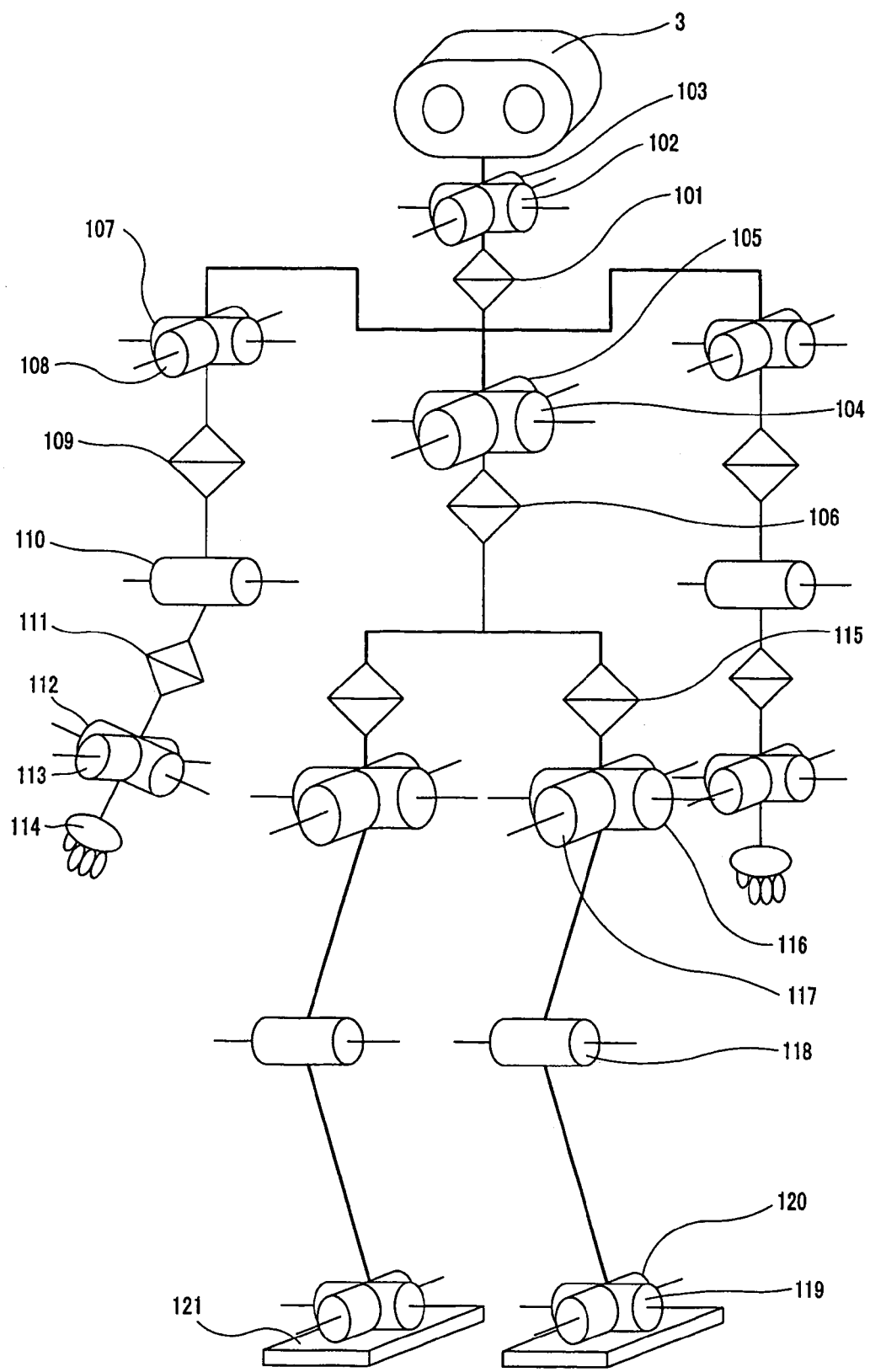
FIG. 2 is a schematic illustration of the functional units of the embodiment of robot apparatus of FIG. 1.

FIG. 2 schematically illustrates the degree of freedom of each of the joints of the robot apparatus 1. The neck joint that supports the head unit 3 has three degrees of freedom realized by a neck joint yaw axis 101, a neck joint pitch axis 102 and a neck joint roll axis 103.

Each of the arm units 4R/L, or the upper limb units, has a shoulder joint pitch axis 107, a shoulder joint roll axis 108, an upper arm yaw axis 109, an elbow joint pitch axis 110, a forearm yaw axis 111, a wrist joint pitch axis 112, a wrist joint roll axis 113 and a hand section 114. The hand section 114 is in fact a multi-joint multi-degree-of-freedom structure that includes a thumb and a plurality of fingers. However, since the motion of the hand section 114 contributes to and influences little the attitude control and the locomotion control of the robot apparatus 1, it is assumed to have zero degrees of freedom in this letter of specification. Therefore, each of the arm units 4R/L has seven degrees of freedom.

The trunk unit 2 has a trunk pitch axis 104, a trunk roll axis 105 and a trunk yaw axis 106 and hens has three degrees of freedom Each of the leg units 5R/L, or the lower limb units, has a hip joint yaw axis 115, a hip joint pitch axis 116, a hip joint roll axis 117, a knee joint pitch axis 118, an ankle joint pitch axis 119, an ankle joint roll axis 120 and a foot section 121. In this letter of specification, the intersection of the hip joint pitch axis 116 and the hip joint roll axis 117 is defined as the hip joint position of the robot apparatus 1. The foot section is in fact a multi-joint multi-degree-of-freedom structure that includes a sole. However, the foot section 121 is assumed to have zero degrees of freedom in this letter of specification. Therefore, each of the leg units 5R/L has six degrees of freedom.

To summarize, the robot apparatus 1 has a total of $3+7\times2+3+6\times2=32$ degrees of freedom as a whole. However, robot apparatus 1 for entertainment are not necessarily limited to 32 degrees of freedom. It may be needless to say that the degrees of freedom and hence the number of joints can be increased or decreased appropriately depending on the restrictive conditions and the requirements of the specification to be met for designing and preparing a robot apparatus.

Each of the degrees of freedom of the robot apparatus 1 is realized by means of an actuator. In view of the requirements to be met by a robot apparatus 1 including that it should not have an excessively expanded appearance and should approximate the natural profile of man and that it should be controlled reliably for its attitude although it is an unstable structure designed for erect bipedalism, each actuator is preferably compact and lightweight.

Figure 3:
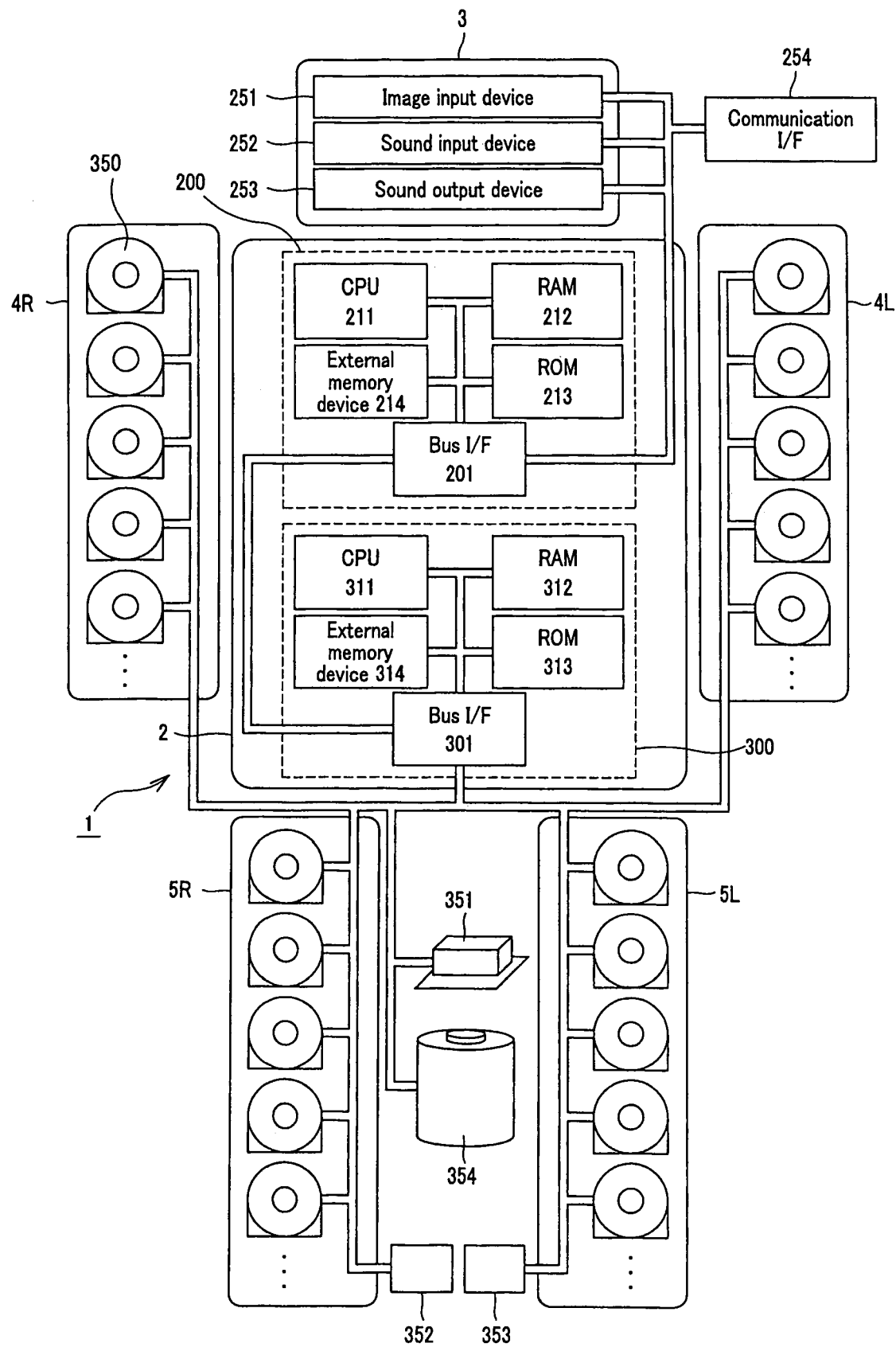
FIG. 3 is a schematic block diagram of the control unit of the embodiment of robot apparatus of FIG. 1.

FIG. 3 schematically shows the control system of the robot apparatus of 1. As shown in FIG. 3, the control system comprises a thinking control module 200 that controls the emotional judgment and the sentimental expression that dynamically respond to the user-related input and a movement control module 300 that controls the concerted movement of the whole body of the robot apparatus 1 that is driven to move by actuators 350.

The thinking control module 200 includes a CPU (central processing unit) 211 that executes arithmetic processing operations relating to the emotional judgment and the sentimental expression, a RAM (random access memory) 212, a ROM (read only memory) 213 and an external memory device (which may include a hard disc drive) 214. It is a stand-alone type information processing device that can process various pieces of information in a self-conclusive manner in the module itself.

The thinking control module 200 decides the current emotion and the current will of the robot apparatus 1 according to the external stimuli including the image data input from an image input device 251 and sound data input from a sound input device 252. The image input device 251 typically comprises a pair of left and right CCD (charge coupled device) cameras, while the sound input device 252 typically comprises a plurality of microphones. The thinking control module 200 can output a sound by way of a sound output device 253 that typically comprises a speaker.

The thinking control module 200 issues a command to the movement control module 300 for carrying out a motion or behavior sequence according to the decision made by the robot apparatus 1 by moving the four limes.

On the other hand, the movement control module 300 comprises a CPU 311 for controlling the concerted movement of the entire body of the robot apparatus 1, a RAM 312, a ROM 313 and an external memory device (which may include a hard disc drive) 314. It is a stand-alone type information processing device that can process various pieces of information in a self-conclusive manner in the module itself. The external memory device 314 can accumulate walking patterns, ZMP trajectories and other behavior plans computationally determined on an offline basis. The expression of a ZMP, or a zero moment point, refers to a point on the floor where the moment is reduced to nil by the reaction force of the floor when the robot apparatus 1 is walking and a ZMP trajectory refers to a trajectory along which the ZMP moves in a locomotive period of the robot apparatus 1, for example. The concept of ZMP and application of stability determining norms of locomotion robots are described in Miomir Vukobratovic "LEGGED LOCOMOTION ROBOTS" (Ichiro Kato "Locomotion Robots and Artificial Legs" (Nikkan Kogyo Shinbun-sha).

The movement control module 300 is connected to various devices of the robot apparatus 1 including the actuators 350 for realizing the degrees of freedom of the joints of the robot apparatus 1 that are distributed in the whole body of the robot apparatus 1 as illustrated in FIG. 2, an attitude sensor 351 for observing the attitude and the inclination of the trunk unit 2, landing verification sensors 352, 353 for detecting the takeoff and the touchdown of the left and right soles and power source control device 354 for managing the power source of the robot apparatus 1 that may typically be a battery by way a bus interface (I/F) 301. The attitude sensor 351 is typically formed by combining an acceleration sensor and a gyro sensor, whereas the landing verification sensors 352, 353 are typically formed by using proximity sensors or microswitches.

The thinking control module 200 and the movement control module 300 are built on a common platform and connected to each other by way of bus interfaces 201, 301.

The movement control module 300 controls the concerted movement of the whole body of the robot apparatus 1 that is produced by the actuators 350 to express a motion directed from the thinking control module 200. More specifically, the CPU 311 takes out a motion that corresponds to the behavior specified by the thinking control module 200 from the external memory device 314 or internally generates a motion pattern. Then, the CPU 311 defines the movement of each of the feet, the ZMP trajectory, the movement of the trunk, that of each of the upper limbs, the horizontal position and the height of the waist and so on according to the specified motion pattern and transfers the command values for realizing the motion as indicated by the definitions to the respective actuators 350.

Additionally, the CPU 311 can adaptively control the concerted movement of the whole body of the robot apparatus 1 by detecting the attitude and the inclination of the trunk unit 2 of the robot apparatus 1 according to the output signal of the attitude sensor 351 and, at the same time, if each of the leg units 5R/L is in an idle state or in a standing state according to the output signal of the corresponding landing verification sensor 352 or 353.

Still additionally, the CPU 311 controls the attitude and the movement of the robot apparatus 1 so as to make the ZMP position to be constantly directed toward the center of the ZMP stability region.

The movement control module 300 is adapted to feedback the extent to which the behavior of the robot apparatus 1 is expressed according to the will decided by the thinking control module 200 and hence the status of the processing operation of itself to the thinking control module 200.

In this way, the robot apparatus 1 can judge the situation of itself and its surroundings and behave autonomously according to the control program.

(2) Motion Control Method of Robot Apparatus

Now, the method of controlling the motions of the above-described robot apparatus 1 will be described below.

As pointed out above, it is important to pursue a scheme that can keep the user away from being bored for an entertainment robot such as the above-described robot apparatus 1. The inventors of the present invention thought that it is effective to repeat (i) making the motion of the user and that of the robot apparatus conform to (to be drawn into) each other and
(ii) deforming (modulating) the conforming relationship by means of an appropriate method for a scheme that can keep the user away from being bored and invented a method of controlling the motions of a robot apparatus 1 within such a framework. Now, imagine a scene where the user and the robot apparatus 1 dance with each other as an example of interaction between them.

The method is aimed to build a conforming relationship between the motion of the user and that of the robot apparatus 1 firstly on a rhythm level in (i) above. As a technique for achieving the aim, the robot apparatus 1 is made to extract the rhythm of the motion of the user as time series waveform information (one-dimensional time series data), which will be described in greater detail hereinafter, and learn a recurrent type neural network (RNN) on a real time basis, using the time series waveform information. Then, the robot apparatus 1 predicts time series waveform information, using the RNN it has learnt, and moves its body with the rhythm. The aimed conforming relationship has been built if the rhythm of the user and that of the robot apparatus 1 conform to each other at this time. It is possible for the robot apparatus 1 to adapt itself to various conforming (drawing) relationships by utilizing the RNN learning ability by means of this technique.

Then, the conforming relationship built in (i) is modified by means of an appropriate technique in (ii). However, if the modulation technique is simple, the user may easily understand it and gradually become bored. Therefore, it is necessary to make the modulation technique complex to a certain extent. However, it is difficult to realize a complex modulation technique simply on the basis of the above-described conforming relationship on the rhythm level.

Therefore, in this embodiment, a number of conforming relationships including the above-described one that is established on a rhythm level are defined and then the defined conforming relationships are modified. As an example, let us define three conforming relationship layers (modules) below. The first module deals with the simplest conforming relationship that is much simpler than the above-described one. More specifically, it is adapted to build a conforming relationship on a predefined rule that the robot apparatus 1 moves its body randomly when it detects a motion on the part of the user. The second module is adapted to build a conforming relationship on a rhythm level by means of the above-described RNN. The third module is adapted to build a complex conforming relationship that is more complex than the above-described conforming relationship and according to which the robot apparatus 1 uses the movement of a part of its body (e.g., the trajectory of the center of the head, one of the hands or one of the feet) as time series data and mimics the motion of the user in a state where the robot apparatus 1 can establish correspondence between its body and its movement.

Modulations of two different levels as listed below may be conceivable to realize the modulation technique aimed at in (ii) under the above defined circumstances.
(a) modulation in each of the modules and
(b) modulation among the modules Of the above-listed two techniques, (a) represents a technique of designing a modulability for the input/output relationship in each of the modules that is different from the ordinary relationship. While any of various different techniques may be used, a simple technique of assigning a random noise to the output data (RNN output value) at a predetermined ratio will be used in this embodiment.

On the other hand, (b) represents a technique of designing an inter-module modulability. For example, the strongest conforming state in the above-described instance is a state where all the three modules show a conforming relationship. If the conforming relationship of an arbitrarily selected module is released and hence the function of the module is turned non-influential on the actuators, a conforming state that is weaker by a step appears and the entire system comes to appear to the user as if it has been modulated. Thus, it is possible to flexibly provide a modulability to the system on a level different from the level of (a) by controlling the conforming state among the modules.

In practice, it is desirable to control the extent of modulation in (ii) according to the reaction of the user, which will be described in greater detail hereinafter.

Figure 4:
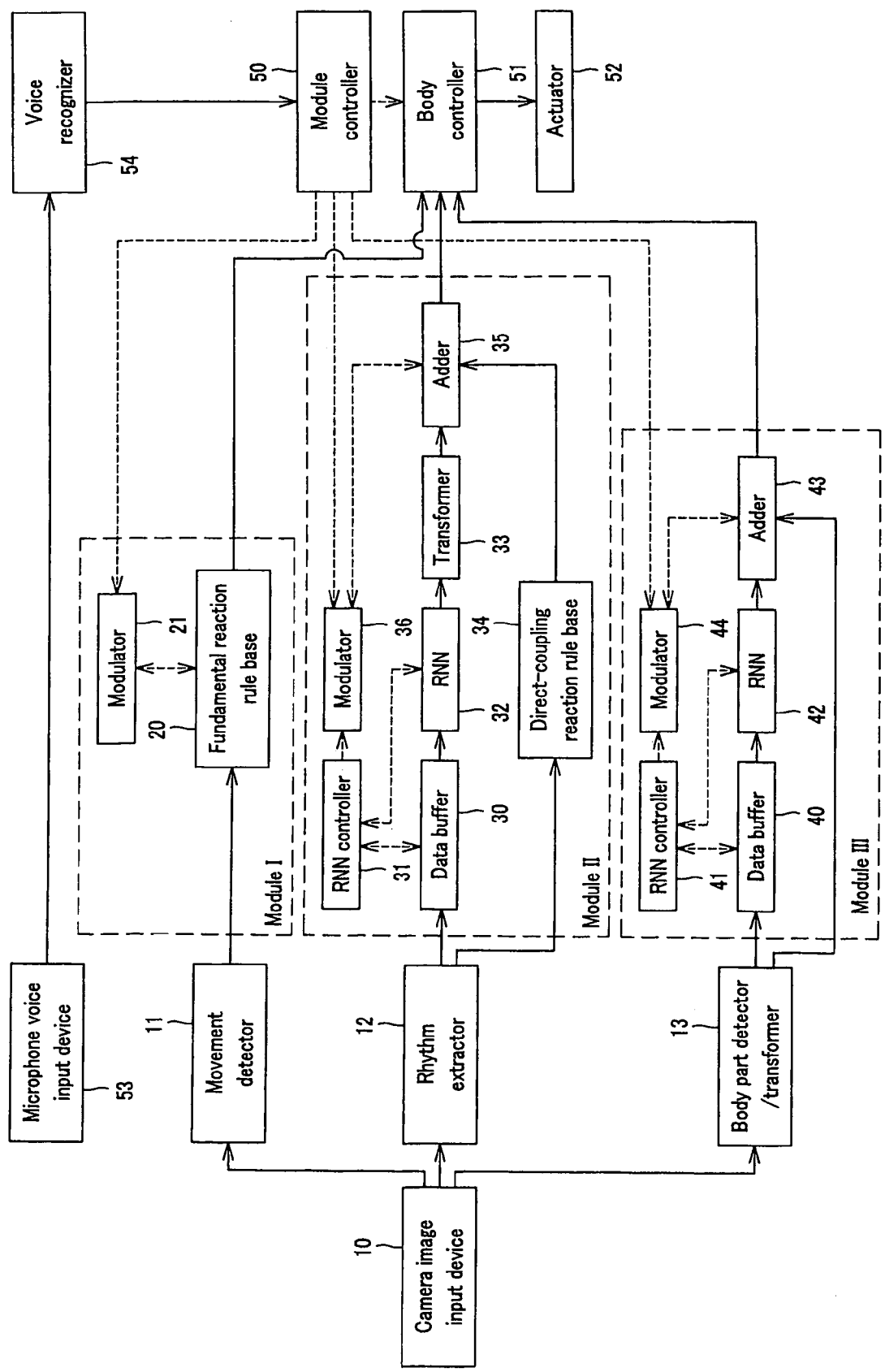
FIG. 4 is a schematic block diagram of the embodiment of robot apparatus of FIG. 1, illustrating the functional blocks and the control method thereof.

FIG. 4 illustrates the functional blocks of the robot apparatus 1 designed to realize the above-described motion control method. As shown in FIG. 4, the robot apparatus 1 possesses modules I through III, which correspond respectively to the above-described first through third modules. The modulators 21, 36, 44 that are arranged respectively in the modules I through III are modulation blocks in the respective modules, while module controller 50 is a block for controlling inter-module modulations.

A camera image input device 10 corresponds to the image input device 251 of FIG. 3 and is adapted to supply a user image to movement detector 11, rhythm extractor 12 and body part detector/transformer 13 per unit time.

The movement detector 11 computes the difference between the image supplied from the camera image input device 10 and the immediately preceding image and extracts a moving region on the basis of the subtraction image. Then, if the area of the moving region is greater than a predetermined value, the movement detector 11 judges that it detects a movement of the user and supplies an ON signal to a fundamental reaction rule base 20 of the module I. Otherwise, the movement detector 11 supplies an OFF signal to the fundamental reaction rule base 20.

Figure 5A:
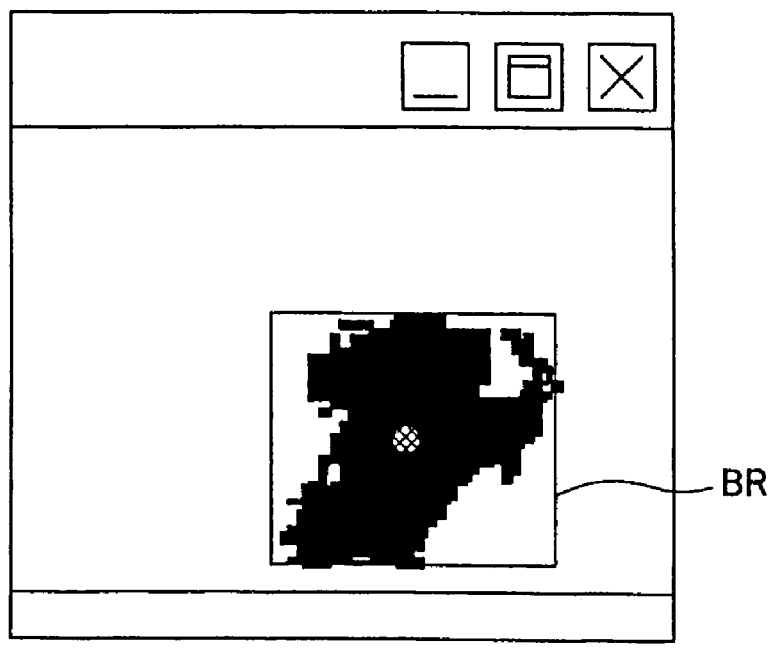
FIG. 5A is a schematic illustration of a movement region that the embodiment of robot apparatus of FIG. 1 extracts from an image and a block region surrounding the movement region.
Figure 5B:
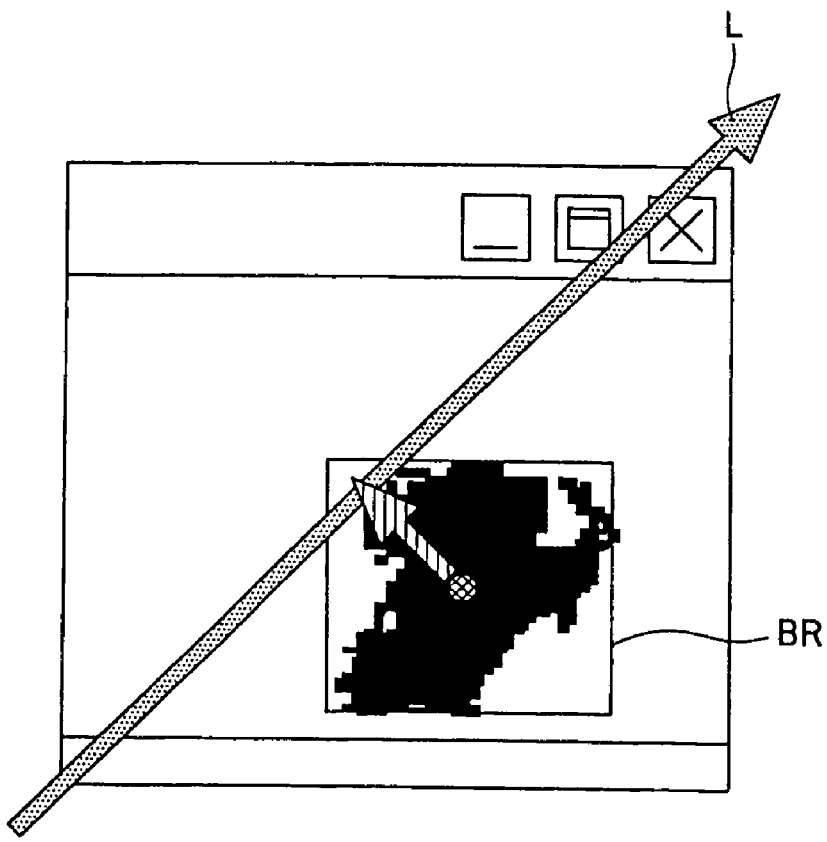
FIG. 5B is a schematic illustration of projection of the central point of the block region of FIG. 5A on an axis passing through the central point of the image and tilted by an arbitrarily selected angle to extract the rhythm.

The rhythm extractor 12 extracts a moving region like the movement detector 11 and determines a rectangle, which is referred to as block region (BR), surrounding the moving region as shown in FIG. 5A. Then, the rhythm extractor 12 extracts the rhythm of the movement of the user from the locus of the central point of the BR at each time point as waveform information. More specifically, as shown in FIG. 5B, it projects the central point of the BR on an axis L that passes the center of the image with an arbitrarily selected angle of inclination at each time point and transforms the projected central point into waveform information that is defined in terms of the axis L and a time base. The rhythm extractor 12 supplies time series waveform information of every predetermined time period to a data buffer 30 of the module II.

The body part detector/transformer 13 determines the positions of the head and the left and right hands, for example, by using basic template matching or color histogram information that is well known in the technological field of image processing and transforms the positional information into joint angle control information of the robot apparatus 1 itself by means of inverse kinematics (see, inter alia, the above-cited Non-Patent Document 1). Then, the body part detector/transformer 13 supplied the joint angle control information of every predetermined time period to a data buffer 40 of the module III.

The module I is a module for building a simple conforming relationship on a predefined rule that the robot apparatus 1 moves its body randomly when it detects a motion on the part of the user and comprises a fundamental reaction rule base 20 and a modulator 21.

A motion to be expressed when an ON signal is supplied from the movement detector 11 and a motion to be expressed when an OFF signal is supplied from the movement detector 11 are designed in the fundamental reaction rule base 20 in advance by a programmer. When an ON signal is supplied, the fundamental reaction rule base 20 typically supplies the ID of each of the two arms and an output value w_out1 that indicates the joint angle vector of the arm in order to cause the two arms to swing back and forth at a given angular speed within a given range. When, on the other hand, an OFF signal is supplied, the fundamental reaction rule base 20 stops supplying them.

The modulator 21 randomly modulates the output value that is supplied to body controller 51 according to the control signal from the module controller 50. For example, if the robot apparatus 1 swings the two arms back and forth at a given angular speed within a given range, the modulator 21 applies a random noise to the angular speed and the range. The random noise may show fluctuations of 1/f that are known to be pleasant to men (see "The Science of Fluctuations 1-9", edited under the supervision of Toshimitsu Musha, Morikita Shuppan).

The next module II is a module for building a conforming relationship on a rhythm level by means of an RNN as described above and comprises a data buffer 30, an RNN controller 31, an RNN 32, a transformer 33, a direct-coupling reaction rule base 34, an adder 35 and a modulator 36.

The data buffer 30 holds the time series waveform information of a given time period supplied from the rhythm extractor 12. The data buffer 30 has a queue structure and discards any data that are older than a predetermined time period.

When time series waveform information of a given time period is held in the data buffer 30, the RNN controller 31 transmits a prediction mode signal to the RNN 32, which RNN 32 by turn computes the prediction accuracy error in the time period, using the time series waveform information of the time period. Then, the transformer 33 transforms the predicted time series waveform information into a motion of the robot apparatus 1 itself. For example, the transformer 33 supplies the ID of each of the two arms and an output value w_RNN2 that indicates the joint angle vector of the arm to the adder 35 in order to cause the two arms to express a motion of swinging back and forth at an angular speed and in a range corresponding to the time series waveform information.

If the value of the predicted accuracy error is not lower than a threshold value, the RNN controller 31 transmits a learning mode signal and has the RNN 32 learn the time series waveform information (see, inter alia, the above-cited Non-Patent Document 1). While the RNN 32 is learning, the direct-coupling reaction rule base 34 transforms the time series waveform information supplied from the rhythm extractor 12 into a motion of the robot apparatus 1 itself. For example, the direct-coupling reaction rule base 34 supplies the ID of each of the two arms and an output value w_Rule2 that indicates the joint angle vector of the arms to the adder 35 in order to cause the two arms to express a motion of swinging back and forth at an angular speed and in a range corresponding to the time series waveform information. Note that the body part or body parts to be moved by the above-described output value W_RNN2 may or may not differ from the body part or body parts to be moved by the output value w_Rule2. Then, the adder 35 determines the linear sum of the output value W_RNN2 and the output value w_Rule2 by means of formula (1) below.

$$W\_out2 = \alpha 1 \cdot w\_RNN2 + \beta 1 \cdot w\_Rule2 \qquad (1)$$

Then, the adder 35 supplies the obtained output value W_out2 to the body controller 51. Note that the parameters α1, β1 may be made to change so as to cause the component of the output value w_Rule2 decrease and the component of the output value W_RNN2 increase with time as the learning of the RNN 32 progresses and the prediction accuracy error is reduced for the purpose of making the motion goes on smoothly.

If, on the other hand, the value of the predicted accuracy error is not higher than a threshold value, the adder 35 supplies the above-described output value W_RNN2 as output value W_out2 to the body controller 51 without suing the output value w_Rule2. As a result, the robot apparatus 1 actively outputs a motion on the basis of its own internal structure so that its mimicking operation becomes stabilized. However, it may alternatively be so arranged that the adder 35 determines the output value W_out2 by means of the above formula (1) if the value of the predicted accuracy error is not higher than the threshold value. Then, it may be so arranged that the adder 35 changes the parameters α1, β1 so as to cause the component of the output value w_Rule2 decrease and the component of the output value W_RNN2 increase with time.

The modulator 36 randomly modulates the output value supplied to the body controller 51 according to the control signal from the module controller 50. The modulator 36 applies a random noise to the parameters α1, β1 of the above-described adder 35 or to the output values w_RNN2, w_Rule2.

Finally, the module III is a module adapted to build a complex conforming relationship of establishing correspondence between its body and its movement and mimicking the motion of the user and comprises a data buffer 40, an RNN controller 41, an RNN 42, an adder 43 and a modulator 44.

The data buffer 40 holds the joint angle control information of a given time period supplied from the body part detector/transformer 13. The data buffer 40 has a queue structure and discards any data that are older than a predetermined time period.

When the joint angle control information of a given time period is held in the data buffer 40, the RNN controller 41 transmits a prediction mode signal to the RNN 42, which RNN 42 by turn computes the prediction accuracy error in the time period, using the joint angle control information of the time period.

If the value of the predicted accuracy error is not lower than a threshold value, the RNN controller 41 transmits a learning mode signal and has the RNN 42 learn the joint angle control information (see, inter alia, the above-cited Non-Patent Document 1). Then, the adder 43 determines the linear sum of the output value w_RNN3 and the output value w_Rule3 supplied from the body part detector/transformer 13 by means of formula (2) below.

$$W\_out3 = \alpha 2 \cdot w\_RNN3 + \beta 2 \cdot w\_Rule3 \qquad (2)$$

Then, the adder 43 supplies the obtained output value W_out3 to the body controller 51. Note that the parameters α2, β2 may be made to change so as to cause the component of the output value w_Rule3 decrease and the component of the output value w_RNN3 increase with time as the learning of the RNN 42 progresses and the prediction accuracy error is reduced for the purpose of making the motion goes on smoothly.

If, on the other hand, the value of the predicted accuracy error is not higher than a threshold value, the adder 43 supplies the above-described output value w_RNN3 as output value W_out3 to the body controller 51 without using the output value w_Rule3. As a result, the robot apparatus 1 actively outputs a motion on the basis of its own internal structure so that its mimicking operation becomes stabilized. However, it may alternatively be so arranged that the adder 43 determines the output value W_out3 by means of the above formula (2) if the value of the predicted accuracy error is not higher than the threshold value. Then, it may be so arranged that the adder 43 changes the parameters α2, β2 so as to cause the component of the output value w_Rule3 decrease and the component of the output value w_RNN3 increase with time.

The modulator 44 randomly modulates the output value supplied to the body controller 51 according to the control signal from the module controller 50. The modulator 44 applies a random noise to the parameters α2, β2 of the above-described adder 43 or to the output values w_RNN3, w_Rule3.

As described above, the body controller 51 integrates the output values W_out1, W_out2 and W_out3 supplied respectively from the modules I through III and transforms them into an instruction for driving the actuators 52. When integrating the output values W_out1, W_out2 and W_out3, the body controller 51 may superpose the output values one on the other or determines the linear sum of the three output values in a manner as described above.

Thus, the robot apparatus 1 of this embodiment has the modules I through III for building respective conforming relationships that are different from each other and integrates their outputs to drive the actuators 52 so that it can handle a complex conforming relationship when it moves, conforming to the motion of the user.

Additionally, since the modules II, III respectively compute the linear sum of the output value W_RNN2 obtained as a result of a learning session of the RNN 32 and the output value w_Rule2 obtained without any learning session and the linear sum of the output value w_RNN3 obtained as a result of a learning session of the RNN 42 and the output value w_Rule 3 obtained without any learning session, it is possible to make the expressed motion proceed smoothly. More specifically, the component of the output value w_Rule2 is made to increase and the component of the output value W_RNN2 is made to decrease in the initial stages of the learning session of the RNN 32 in order to make it possible to relatively stably express the motion without interrupting the motion but conversely the component of the output value W_RNN2 is made to increase and the component of the output value w_Rule2 is made to decrease as the learning progresses in order to gradually stabilize the motion. Similarly, the component of the output value w_Rule3 is made to increase and the component of the output value w_RNN3 is made to decrease in the initial stages of the learning session of the RNN 42 in order to make it possible to relatively stably express the motion without interrupting the motion but conversely the component of the output value w_RNN3 is made to increase and the component of the output value w_Rule3 is made to decrease as the learning progresses in order to gradually stabilize the motion. However, it is not necessary to use such an increasing/decreasing technique and the parameters can be freely modified for the modulations.

While three modules are used to build conforming relationships in the above-described embodiment, the number of modules is by no means limited to three and a number of modules other than three may be used for the purpose of the present invention. Additionally, while rule bases and RNNs are used for describing conforming (drawing) relationships of input/output data in the above embodiment, some other known technique such as the use of oscillator models or ordinary neural networks may alternatively be used for the purpose of the present invention.

Since the robot apparatus 1 of this embodiment is adapted to use three modules I through III, it can build complex conforming relationships and the conforming relationship of each module can be modulated. However, the modulation technique that is complete within each of the modules is simple and hence can be understood easily by the user. Then, the user may become bored gradually.

Therefore, not only the conforming relationship of each of the modules is modulated but also a technique of inter-module modulation of conforming relationships is adopted in this embodiment. The module controller 50 is responsible for such inter-module modulations of conforming relationships. Particularly, the module controller 50 of this embodiment controls the extent of inter-module modulation according to the reaction of the user such as "irritated", "neutral", "bored" or "comfortable" or some other state of affect on the part of the user.

The known techniques that have been proposed to date in order to detect the state of affect of a user include one using the facial expression and/or information on the pitch and the power of the voice of the user (see "J. R. Movellan and M. S. Bartlett, "The Next Generation of Automatic Facial Expression Measurement", In; P. Ekman (eds) "What the Face Reveals", Oxford University Press, 2003"). For the purpose of simplicity, assume here that a technique of having the user speak out words expressing states of affect and inputting them by way of a microphone voice input device 53 so as to be recognized by a voice recognizer 54 is used to classify the states of affect of the user into the above-listed four categories. In actuality, words that agree with "irritated", those that agree with "bored" and those that agree with "comfortable" are prepared as dictionary and words that do not agree with any of them are judged to be "neutral.

If the state of affect of the user is "irritated", the module controller 50 judges that the conforming relationship with the user is not sufficient yet and strengthens the conforming relationship by increasing the number of modules to be used for conforming outputs. For example, if the number of modules is two when the state of affect of the user is "neutral", the module controller 50 increases the number of modules to three and builds a strengthened conforming relationship when the state of affect of the user is detected to be "irritated". It is possible for the module controller 50 to transmit a control signal to each of the modules so as to increase the learning parameters that are defined in the learning algorithm of the RNNs by a given value. It will be appreciated that the module I that does not have any learning parameter is left unmodified.

If the state of affect of the user is "neutral", the module controller 50 judges that the current conforming relationship is not bad and transmits a control signal to the modulators 21, 36, 44 at every given time period so as to modulate the conforming relationship by fluctuations without remarkably modulating the relationship. Modulation by fluctuations is not clearly perceived by the user but it is introduced as a steady state because fluctuations can relax the human mind.

If the state of affect of the user is "bored", the module controller 50 judges that the user is bored by the current conforming relationship and modulates the conforming relationship depending on the extent of being bored on the part of the user. More specifically, if "bored" is detected consecutively for more than a predetermined number of times, the module controller 50 modulates the conforming relationship to a large extent. However, if otherwise, the module controller 50 modulates the conforming relationship only to a limited extent. When the conforming relationship is to be modulated to a large extent, the module controller 50 changes the configuration of the modules in addition to that it transmits a command for a random modulation to the modulators 21, 36, 44 of the modules. Techniques that can be used for changing the configuration include a technique of changing the configuration entirely randomly, a technique of randomly selecting a module out of the currently operating modules and excluding it from the conforming relationship, a technique of randomly selecting a module out of the modules that are currently not operating and adding it to the conforming relationship and a technique of adding a hierarchically high module to or excluding a hierarchically high module from the current conforming relationship provided that hierarchy is defined for the existing modules. For example, if hierarchy is defined for the modules I, II, III so as to restrict their motions in the listed order and the modules I and II are currently operating, the module II can be excluded and the module III can be added. When the body controller 51 computes the linear sum of the output values supplied from the modules I through III, it is possible to change the ratio of the output values of the modules by modifying the parameters that are used for the linear sum without increasing or decreasing the number of modules. When, on the other hand, the conforming relationship is to be modulated to a small extent, the module controller 50 transmits a command for a random modulation to the modulators 21, 36, 44 of the modules without changing the configuration of each of the modules.

If, finally, the state of affect of the user is "comfortable", the module controller 50 judges that the current conforming relationship is good to the user. Therefore, it does not modulate the conforming relationship and allows the current motion to continue.

As described above, the robot apparatus 1 of this embodiment is adapted to modulate the conforming relationship not only within each of the modules but also on an inter-module basis depending on the state of affect of the user such as "irritated", "neutral", "bored" or "comfortable" so that it is possible to realize a motion that is less boring to the user.

The present invention is by no means limited to the above-described embodiment, which can be modified and altered without departing from the spirit and scope of the present invention.

For instance, while the modules I through III of this embodiment are adapted to generate respective motions that conform to the motion of the user but differ from each other in response to the image input to the robot apparatus 1 by way of the camera image input device 10 in the above description, they may be so adapted as to generate respective motions that differ from each other in response not to the image but to the sound input to the robot apparatus 1. Alternatively, they may be so adapted to generate respective motions in response to the combination of the image and the sound. If they generate respective motions conforming to the motion of the user in response to the sound input from the user, they may be so adapted as to extract the rhythm or the like of the motion of the user from the clapping sound and/or the stamping sound of the user and generate respective motions in response to the extracted rhythm.

While the robot apparatus 1 of the above embodiment interacts with the user (human being) in the above description, the object of interaction of the robot apparatus 1 is not limited to the user. It may be some other robot apparatus that can operate like the robot apparatus 1 or some other moving subject.

It should be understood by those skilled in the art that various modifications, combinations, sub-combinations and alterations may occur depending on design requirements and other factors insofar as they are within the scope of the appended claims or the equivalents thereof.

What is claimed is:

1. A robot apparatus capable of moving autonomously, the robot apparatus comprising:
   a joint having a degree of freedom;
   an actuator for actuating the joint;
   input means for inputting an image of an external moving body;
   a motion controller, comprising:
      means for generating a waveform corresponding to the image of the moving body;
      a rhythmic motion module for generating, based on the waveform, a rhythmic motion signal corresponding to a rhythm of the moving body;
      means for detecting a body part in the image of the moving body;
      a body position module for generating, based on the detected body part, a body position signal indicative of a position of the moving body;
      a modulator for modulating the rhythmic motion signal and the body position signal; and
      a body controller for controlling the actuator based on the modulated rhythmic motion signal and the modulated body position signal.

2. The robot apparatus according to claim 1, further comprising:
   a microphone for receiving voice input; and
   a voice recognizer for determining a mood based on the voice input,
   wherein the body controller controls the modulator based on the determined mood.

3. The robot apparatus according to claim 1, wherein the rhythmic motion module includes:
   a buffer for storing the waveform over a time period;
   a predicted rhythmic motion module for generating, based on the stored waveform, a predicted rhythmic motion signal corresponding to a predicted rhythm of the moving body;
   an actual rhythmic motion module for generating, based on a current state of the waveform, an actual rhythmic motion signal corresponding to an actual rhythm of the moving body; and
   an adder for adding the predicted rhythmic motion signal and the actual rhythmic motion signal to produce the rhythmic motion signal, and
   the motion generating means body positioning module includes:
      a buffer for storing positioning information of the detected body part over a time period;
      a predicted body position module for generating, based on the stored positioning information, a predicted body position signal corresponding to a predicted position of the moving body;
      an actual body position module for generating an actual body position signal corresponding to an actual position of the detected body part; and
      an adder for adding the predicted body position signal and the actual body position signal to produce the body position signal.

4. The robot apparatus according to claim 3, further comprising:
   a rhythm prediction accuracy module for computing an accuracy of the predicted rhythmic motion signal relative to the actual rhythmic motion signal; and
   a body position accuracy module for computing an accuracy of the predicted body position signal relative to the actual body position signal,
   wherein the adders change parameters of the rhythmic motion signal and the body position signal based on the computed accuracies or according to a lapse of time.

5. The robot apparatus according to claim 1, wherein the external moving body is a user of the robot apparatus.

6. A method of controlling the motion of a robot apparatus capable of moving autonomously, the method comprising:
   receiving an image of an external moving body;
   generating a waveform corresponding to the image of the moving body;
   generating, based on the waveform, a rhythmic motion signal corresponding to a rhythm of the moving body;
   detecting a body part in the image;
   generating, based on a position of the detected body part, a body position signal indicative of a position of the moving body;
   modulating the rhythmic motion signal and the body position signal; and
   controlling an actuator for a joint of the robot apparatus based on the modulated rhythmic motion signal and the modulated body position signal.

7. The method according to claim 6, further comprising:
   receiving voice input; and
   determining a mood based on the voice input,
   wherein the modulation is controlled based on the mood.

8. The method according to claim 6, wherein
   generating a rhythmic motion signal includes:
      storing the waveform over a time period;
      generating, based on the stored waveform, a predicted rhythmic motion signal corresponding to a predicted rhythm of the moving body;
      generating, based on a current state of the waveform, an actual rhythmic motion signal corresponding to an actual rhythm of the moving body; and
      adding the predicted rhythmic motion signal and the actual rhythmic motion signal to produce the rhythmic motion signal, and
   generating a body position signal includes:
      storing positioning information of the detected body part over a time period;
      generating, based on the stored positioning information, a predicted body position signal corresponding to a predicted position of the moving body;
      generating an actual body position signal according to an actual position of the detected body part; and adding the predicted body position signal and the actual body position signal to produce the body position signal.

9. The method according to claim 8, further comprising:
computing an accuracy of the predicted rhythmic motion signal relative to the actual rhythmic motion signal;
computing an accuracy of the predicted body position signal relative to the actual body position signal; and
changing parameters of the rhythmic motion signal and the body position signal based on the computer accuracies or according to a lapse of time.

10. The method according to claim 6, wherein the external moving body is a user of the robot apparatus.

11. A robot apparatus capable of moving autonomously, the robot apparatus comprising:
a joint having a degree of freedom;
an actuator that actuates the joint;
an input section that inputs an image of an external moving body;
a motion controller, comprising:
a waveform generator that generates a waveform corresponding to the image of the moving body;
a rhythmic motion module that generates, based on the waveform, a rhythmic motion signal corresponding to a rhythm of the moving body;
a detector that detects a body part in the image of the moving body;
a body position module that generates, based on the detected body part, a body position signal indicative of a position of the moving body; and
a modulator that modulates the rhythmic motion signal and the body position signal; and
a body controller that controls the actuator based on the modulated rhythmic motion signal and the modulated body position signal.

* * * * *